United States Patent
Leung et al.

(10) Patent No.: US 8,649,613 B1
(45) Date of Patent: Feb. 11, 2014

(54) MULTIPLE-INSTANCE-LEARNING-BASED VIDEO CLASSIFICATION

(75) Inventors: Thomas Leung, Santa Clara, CA (US); Yang Song, San Jose, CA (US); John Zhang, New York, NY (US)

(73) Assignee: Google Inc., Mountain View, CA (US)

( * ) Notice: Subject to any disclaimer, the term of this patent is extended or adjusted under 35 U.S.C. 154(b) by 32 days.

(21) Appl. No.: 13/288,906

(22) Filed: Nov. 3, 2011

(51) Int. Cl.
   *G06K 9/62* (2006.01)
   *G06K 9/54* (2006.01)
   *G06K 9/60* (2006.01)

(52) U.S. Cl.
   USPC ........... 382/224; 382/305; 382/155; 382/156; 382/157; 382/158; 382/159

(58) Field of Classification Search
   None
   See application file for complete search history.

(56) References Cited

U.S. PATENT DOCUMENTS

| | | | |
|---|---|---|---|
| 7,764,808 B2 * | 7/2010 | Zhu et al. | 382/104 |
| 8,019,702 B1 * | 9/2011 | Gargi et al. | 706/12 |
| 2007/0255755 A1 * | 11/2007 | Zhang et al. | 707/104.1 |
| 2009/0083010 A1 * | 3/2009 | Qi et al. | 703/2 |
| 2011/0047163 A1 * | 2/2011 | Chechik et al. | 707/741 |
| 2012/0089545 A1 * | 4/2012 | Mei et al. | 706/20 |
| 2012/0123978 A1 * | 5/2012 | Toderice et al. | 706/12 |

OTHER PUBLICATIONS

Pickering et al., "Video Retrieval by Feature Learning in Key Frames", in Proceedings of International Conference on Image and Video Retrieval (CIVR 2002), pp. 309-317.*

Tieu et al., "Boosting Image Retrieval", International Journal of Computer Vision 2000, pp. 1-8.*

Anderson, R., A local algorithm for finding dense subgraphs, In Proc. 19th Annual ACM-SIAM Symposium on Discrete Algorithms, 2008, pp. 1003-1009.

Andrews, S., et al., "Multiple-instance learning via disjunctive programming boosting," In In NIPS, 16, 2004, 8 pages.

Auer, P., et al., "A boosting approach to multiple instance learning," $15^{th}$ European Conference on Machine Learning, Sep. 20-24, 2004, pp. 63-74, LNAI 3201.

Babenko, B., et al., "Simultaneous learning and alignment: Multi-instance and multi-pose learning," In Faces in Real-Life Images, Oct. 2008, pp. 1-14.

Babenko, B., et al., Visual tracking with online multiple instance learning. In Proc. CVPR, Jun. 2009, pp. 983-990.

Berg, T. L., et al., "Animals on the web," In Proc. Computer Society Conference on Computer Vision and Pattern Recognition, 2006, 8 Pages.

Berg, T., et al., "Automatic Attribute Discovery and Characterization from Noisy Web Data," ECCV, 2010, pp. 663-676, Part I, LNCS 6311.

Chen, Y., et al., "Miles: Multiple instance learning via embedded instance selection," IEEE Transactions on Pattern Analysis and Machine Intelligence, Dec. 2006, vol. 28, No. 12, pp. 1931-1947.

(Continued)

*Primary Examiner* — Matthew Bella
*Assistant Examiner* — Thomas Conway
(74) *Attorney, Agent, or Firm* — Fenwick & West LLP (57) ABSTRACT

A classifier training system trains unified classifiers for categorizing videos representing different categories of a category graph. The unified classifiers unify the outputs of a number of separate initial classifiers trained from disparate subsets of a training set of media items. The training process divides the training set into a number of bags, and applies a boosting algorithm to the bags, thus enhancing the accuracy of the unified classifiers.

18 Claims, 5 Drawing Sheets

(56) References Cited

OTHER PUBLICATIONS

Dalal, N., et al., "Histogram of oriented gradients for human detection," In Proc. Computer Society Conference on Computer Vision and Pattern Recognition, 2005, 8 Pages.

Dollar, P., et al., "Behavior recognition via sparse spatio-temporal features," In ICCV'05 Workshop on Visual Surveillance and Performance Evaluation of Tracking and Surveillance, Oct. 15-16, 2005, pp. 65-72.

Fan, R.-E., et al., "Liblinear: A library for large linear classification," Journal of Machine Learning Research, 2008.

Fergus, R., et al., "Learning object categories from google's image search," Proceedings of the Tenth IEEE International Conference on Computer Vision (ICCV'05), 2005, 8 Pages.

Fergus, R., et al., Semi-supervised learning in gigantic image collections. In NIPS, 2009, pp. 1-9.

Guillaumin, M., et al., "Multiple instance metric learning from automatically labeled bags of faces," In Proc. ECCV, 2010, pp. 634-647, Part I, LNCS 6311.

Ikizler-Cinbis, N., et al., "Learning actions from the web," IEEE 12th International Conference on Computer Vision (ICCV), 2009, pp. 995-1002.

Karmaker, A., et al., "A boosting approach to remove class label noise," In Proc. International Conference on Hybrid Intelligent Systems, 2005, pp. 206-211.

Keeler, J. D., et al., Integrated segmentation and recognition of handprinted numerals. In Proceedings of the 1990 conference on Advances in neural information processing systems 3, NIPS-3, pp. 557-563, San Francisco, CA, USA, 1990.Morgan Kaufmann Publishers Inc.

Leung, T., et al., Representing and recognizing the visual appearance of materials using three dimensional textons. International Journal of Computer Vision, 2001, vol. 43, No. 1, pp. 29-44.

Li, L.-J., et al., "Optimol: automatic object picture collection via incremental model learning," In Proc. IEEE Conf. Computer Vision and Pattern Recognition, 2007.

Neapolitan, R. E., et al., "Learning Bayesian Networks," Prentice-Hall, Inc., Upper Saddle River, NJ, USA, 2003, Cover page and Table of Conents, 7 Pages.

Rabiner, L., et al., "Digital processing of speech signals," Prentice-Hall, Inc., 1978 , Cover page and Table of Conents, 13 pages.

Shotton, J., et al., "Semantic texton forests for image categorization and segmentation," In Proc. CVPR, 2008, 8 Pages.

Song, Y., et al., "Taxonomic classification for web-based videos," In Proc. CVPR, Jun. 2010, pp. 871-878.

Vezhnevets, A., et al., "Towards weakly supervised semantic segmentation by means of multiple instance and multitask learning," In Proc. CVPR, Jun. 2010, pp. 3249-3256.

Viola, P., et al., Rapid object detection using a boosted cascade of simple features. Proc. CVPR, 2001, pp. I-511-I-518.

Viola, P., et al., "Multiple instance boosting for object detection," In In NIPS 18, MIT Press, 2006, pp. 1417-1424.

Wang, Z., et al., "Youtubecat: Learning to categorize wild web videos," In Proc. CVPR, Jun. 2010, pp. 879-886.

Wu, D., et al., "A Min-Max Framework of Cascaded Classifier with Multiple Instance Learning for Computer Aided Diagnosis," IEEE, 2009, pp. 1359-1366.

Xu, X., et al., "Logistic regression and boosting for labeled bags of instances," Lecture Notes in Computer Science, Apr. 2004, vol. 3056, pp. 272-2816.

Zanetti, S., et al., "A walk through the web's video clips," In Proc. First IEEE Workshop on Internet Vision, in CVPR, 2008, 8 Pages.

Zhang, Y., et al., "Learning from Multi-topic Web Documents for Contextual Advertisement," KDD'08, Aug. 24-27, 2008, Las Vegas, Nevada, USA, pp. 1051-1059.

Zhu, X., et al., "Eliminating class noise in large datasets," In Proc. ICML, 2003, pp. 920-927.

Blum, A. et al., "Combining labeled and unlabeled data with co-training," In Proc. 11th Annual Conference on Computational Learning Theory, COLT, Jul. 1998, pp. 92-100.

Davison, B. D., "Topical locality in the web," In Proc. 23rd Annual International ACM SIGIR Conference on Research and Development in Information Retrieval, 2004, pp. 272-279.

Dekel, O., et al., "Large margin hierarchical classification," Proceedings of the 21 st International Conference on Machine Learning, Banff, Canada, 2004, 8 pages.

Deng, J., et al., "ImageNet: A Large-Scale Hierarchical Image Database," IEEE Computer Society Conference on Computer Vision and Pattern Recognition, Jun. 22, 2009, pp. 248-255.

Dumais, S., et al., "Hierarchical classification of web content," In SIGIR '00: Proceedings of the $23^{rd}$ annual international ACM SIGIR conference on Research and development in information retrieval, pp. 256-263, New York, NY, USA, 2000. ACM.

Freund, Y., et al., "A decision-theoretic generalization of on-line learning and an application to Boosting," Journal of Computer and System Sciences, 1997, pp. 119-139, vol. 55, article No. SS971504.

Goldman, S., et al., "Enhancing supervised learning with unlabeled data," In Proc. $17^{th}$ International Conference on Machine Learning, 2000, pp. 327-334.

Guillaumin, M., et al., "Multimodal semi-supervised learning for image classification," In Proc. IEEE Conf. Computer Vision and Pattern Recognition, Jun. 2010, pp. 902-909.

Gupta, S., et al., "Watch, listen & learn: Co-training on captioned images and videos," In Proc. ECML PKDD , 2008, Part I, LNAI 5211, pp. 457-472.

Halevy, A., et al., "The unreasonable effectiveness of data," Intelligent Systems, IEEE, Mar. 2009, pp. 8-12, vol. 24, No. 2.

Huang, J., et al., "Exploring web scale language models for search query processing," In Proc. 19th international conference on World wide web, Apr. 26-30, 2010, pp. 451-460.

Koller, D., et al., "Hierarchically classifying documents using very few words," In the Proceedings of the Fourteenth International Conference on Machine Learning, ICML, Jul. 8-12, 1997, pp. 170-178.

Li, L.-J., et al., "Towards total scene understanding: Classification, annotation and segmentation in an automatic framework," In Proc. IEEE Conf. Computer Vision and Pattern Recognition, 2009, pp. 2036-2043.

Liu, T.-Y., et al., "Support vector machines classification with a very large-scale taxonomy," In SIGKDD Explorations, 2005, pp. 36-43, vol. 7, Issue 1.

Mahajan, D., et al., "Image classification using the web graph," In Proc. Multimedia, Oct. 25-29, 2010, pp. 991-994.

Niebles, J. C., et al., "Extracting moving people from internet videos," In ECCV '08: Proceedings of the 10th European Conference on Computer Vision, 2008, pp. 527-540, Part IV, LNCS 5305.

Schapire, R. E., "The boosting approach to machine learning: an overview," In MSRI Workshop on Non-linear Estimation and Classification, 2002, pp. 1-23.

Schindler, G., et al., Internet video category recognition. In Proc. First IEEE Workshop on Internet Vision, in CVPR, 2008, pp. 1-7.

Sun, A., et al., "Hierarchical text classification and evaluation," In ICDM, 2001, pp. 521-528.

Tang, L., et al., "Large scale multi-label classification via metalabeler," In Proc. $18^{th}$ International Conference on World Wide Web, Apr. 20-24, 2009, pp. 211-220.

Zhu, X., Semi-supervised learning literature survey. In Tech Report. University of Wisconsin—Madison, Jul. 2008, pp. 1-60.

\* cited by examiner

MULTIPLE-INSTANCE-LEARNING-BASED VIDEO CLASSIFICATION

BACKGROUND

1. Field of Art

The present disclosure generally relates to the field of digital video, and more specifically, to methods of generating accurate classifiers for identifying categories of a video.

2. Background

Video hosting services, such as YOUTUBE™, have become an increasingly popular way of sharing and viewing digital videos, with users contributing tens of millions of videos each year. Accurate categorization of a video is of great value in such systems, permitting users to search for videos corresponding to given categories, and the video hosting service to more accurately match videos with relevant advertising, and the like.

However, the descriptive metadata information provided by the user who contributes a video often does not result in the correct categorization of the video. For example, for a set of predetermined categories including categories such as "Sports," "Basketball," "Tennis," and the like, a video entitled with the name of a tennis player featured in the video would not in itself directly permit the video to be properly categorized as "Tennis" or "Sports."

Machine learning algorithms can be employed to train a classifier function for a given category (e.g., "Tennis") that, when applied to features of a video (such as metadata of the video), outputs a measure of the relevance of the video to the category. Then, the trained classifier function for a given category can be applied to a video and the resulting measure of relevance used to determine whether the video is within that category. However, to train a classifier function for a category, most learning algorithms employ supervised learning, which requires as input a training set of videos from a video repository, the training set known a priori to be representative of the category. Further, supervised learning tends to produce more accurate classifier functions when trained on a larger training set, and/or a training set with features that are more useful for categorization purposes. However, in large scale video hosting services, where tens of thousands of videos are being uploaded every day, humans cannot efficiently view and label a sufficiently large sample of videos. Thus, there are typically few pre-categorized videos available for training purposes, and the classifier functions trained using these small training sets are therefore not as effective as could be desired in categorizing the large number of videos that have not already been manually categorized. Additional means are needed to create a sufficiently large training set for the categorization process.

Additionally, some conventional algorithms that train classifier functions for various categories assume that the categories are independent of each other. When the categories do in fact have some relationship, such as being "parent" or "child" categories to each other, this assumption of category independence fails to capture relationship information that could provide additional accuracy to the trained classifier functions.

SUMMARY

A classifier training system trains a classifier functions (hereinafter simply "classifiers") for categorizing videos representing different categories of a category graph. The classifiers are referred to as unified classifiers in that they unify the outputs of a number of separate initial classifiers trained from multiple disparate subsets of a training set of media items. Each unified classifier thus unites different types of training information within a single classifier. The training of a unified classifier takes into account inter-category relationships, which enhances training accuracy.

More specifically, the classifier training system begins with some set of pre-determined categories arranged in a graph indicating relationships between categories, wherein nodes in the graph represent categories, and edges between nodes represent relationships between categories. For example, the category graph could include a node for the category "Tennis" with an edge to a node for the parent category "Sports." The classifier training system further begins with a training set of media items from which the unified classifier is trained. The media items can include—in addition to videos—other types of content, such as web pages and other textual documents, images, sound files, and the like. The training set comprises a first subset of videos, each of which has been previously authoritatively labeled (e.g., by a human expert) as representing one or more of the categories; the training set is accessed from a video repository. The classifier training system also begins with one or more other subsets of media items, each set of which can be of a different content type (e.g., web pages rather than videos) or obtained in a different manner. For example, videos that watched before or after one of the videos of the first subset by the same user ("co-watched" with the first video) are automatically inferred to be in the same categories as the video of the first subset.

For each of a plurality of the categories, there are multiple initial classifiers, each of which outputs a value indicating whether a given media item represents the initial classifier's category. The initial classifiers are trained from combinations of the first subset of videos with the other subsets of media items, such as labeled web documents or audio items. For example, for each category there could be (1) an initial classifier trained from the textual features of the videos of the first subset and of videos co-watched with the videos of the first subset, and (2) another initial classifier trained from the audiovisual features of these same two subsets. The training of the initial classifiers may be performed by the classifier training system itself, or it may be performed by another system, with the initial classifiers being provided as input to the classifier training system.

The initial classifiers for each category are then applied to each media item in the training set to generate scores representing whether (or how strongly) the media item represents the associated categories. For a given media item, these scores—e.g., Boolean or scalar values—form a feature vector describing characteristics of the media items to which they correspond. For example, a given media item there would have a feature vector with M*K scores, one for each of the K categories and the M initial classifiers per category. Thus, features from subsets of the media items with potentially different characteristics are combined within a single feature vector.

The scores computed from the initial classifiers as applied to the media items of the training set are provided as input for a multiple instance learning (MIL) process that trains the unified classifiers, one per category. The MIL process learns classifier parameters of a probabilistic machine learning algorithm based on the known category labels of the media items of the training set, on the computed scores, and on the relationships between the categories of the category graph. In one embodiment, the MIL process divides the training set into a number of bags, and applies a boosting algorithm to the bag to determine the unified classifiers.

Once the classifier parameters have been learned as part of the training of the unified classifiers, the unified classifiers can then be applied to an arbitrary video, each unified classifier producing as its output a score for each of the categories that indicates how strongly the video represents that category.

In one embodiment, the classifier training system is not limited to learning unified classifiers for digital videos, specifically, but rather can learn unified classifiers for any media object for which meaningful features can be extracted, including images, presentations, text documents, audio files, and the like.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the subject matter of the claims.

The figures depict embodiments of the present disclosure for purposes of illustration only. One skilled in the art will readily recognize from the following description that alternative embodiments of the structures and methods illustrated herein may be employed without departing from the principles described herein.

DETAILED DESCRIPTION

System Architecture

Figure 1:
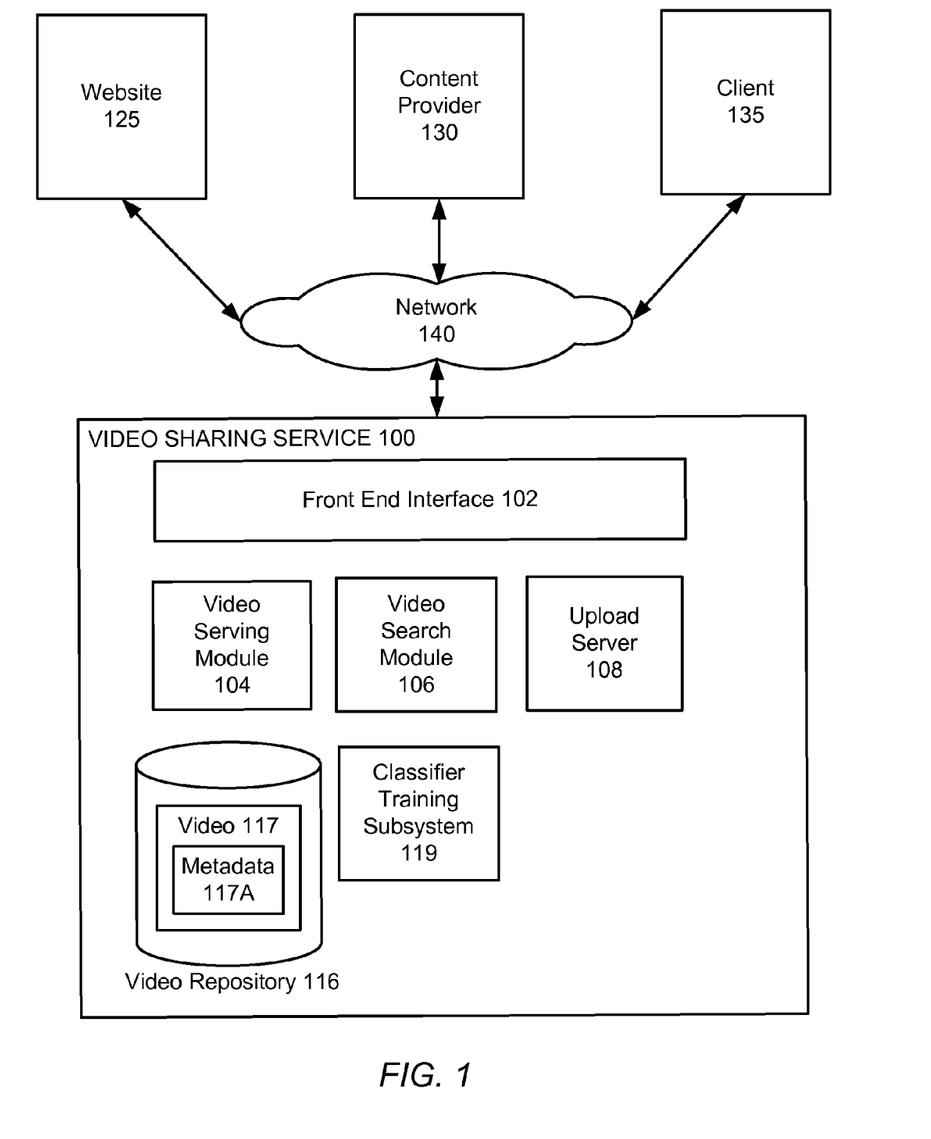
FIG. 1 is a block diagram of a video hosting service in which classifier training can be employed, according to one embodiment.

FIG. 1 is a block diagram of a video hosting service 100 in which classifier training can be employed, according to one embodiment. The video hosting service 100 represents a system such as that of YOUTUBE™ that stores and provides videos to users via client devices 135. The video hosting service 100 communicates with a plurality of content providers 130 and client devices 135 via a network 140 to facilitate sharing of video content between users. The video hosting service 100 can additionally obtain data from various external websites 125. The video data from the content providers 130, and (optionally) the web page or other data from the websites 125, serves as input data for classifier training performed by the video hosting service 100. Note that for the sake of clarity FIG. 1 depicts only one instance of website 125, content provider 130 and client device 135, though there could be any number of each.

Generally, a user of the content provider device 130 provides video content to the video hosting service 100 and a (usually different) user uses a client device 135 (also referred to simply as "client") to view that content. In practice, content provider devices 130 may also be used to view content. Additionally, a particular content provider device 130 may be operated by the same entity that operates the video hosting service 100.

The user of the content provider device 130 performs various content provider functions. Content provider functions may include, for example, uploading a video to the video hosting service 100, editing a video stored by the video hosting service 100, editing metadata information about a video, or editing content provider preferences associated with a video.

A client device 135 is a computing device that executes client software, e.g., a web browser or built-in client application, to connect to the video hosting service 100 via a network 140 and to display videos. The client device 135 might be, for example, a personal computer, a personal digital assistant, a cellular, mobile, or smart phone, a television "set-top box," or a laptop computer. In some embodiments, the client 135 includes an embedded video player such as, for example, the FLASH player from Adobe Systems, Inc. or any other player adapted for the video file formats used in the video hosting service 100.

Note that the terms "client" and "content provider" as used herein may refer to software providing client and content providing functionality, to hardware devices on which the software executes, or to the entities operating the software and/or hardware, as is apparent from the context in which the terms are used.

The website 125 comprises one or more web pages accessible to the video hosting service 100 via the network 140. The web pages comprise, for example, textual content such as HTML. The website may make available additional types of media content, such as general textual documents, presentations, audio files, image files, and the like.

The network 140 is typically the Internet, but may be any network, including but not limited to a LAN, a MAN, a WAN, a mobile wired or wireless network, a private network, or a virtual private network.

The video hosting service 100 operates on the video data from the content providers 130 (and, optionally, from the website 125) when training video classifiers. The video hosting service includes a front end interface 102, a video serving module 104, a video search module 106, an upload server 108, and a video repository 116. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE™ website, found at www.youtube.com. Other video hosting sites are known, as well, and can be adapted to operate according to the teachings disclosed herein.

In this description, the term "module" refers to computational logic for providing the specified functionality. A module can be implemented in hardware, firmware, and/or software. It will be understood that the named modules described herein represent one embodiment of the present disclosure, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the service 100, loaded into memory, and executed by the one or more processors of the service's computers. The foregoing further applies to components described herein as "servers." As will become apparent, the various data processing operations described herein are sufficiently complex and time consuming as to require the operation of a computer system such as the system 100 in order to practice embodiments of the disclosure.

The upload server 108 of the video hosting service 100 receives video content from a content provider 130. Received content is stored in the video repository 116. In response to requests from clients 135, a video serving module 104 provides video data from the video repository 116 to the clients. Clients 135 may also search for videos of interest stored in the video repository 116 using a video search module 106, such as by entering textual queries containing keywords of interest. The front end interface 102 provides the interface between client 135 and the various components of the video hosting service 100.

The video repository 116 contains a set of videos 117 submitted by content providers 130. The video repository 116 can contain any number of videos 117, such as tens of thousands or hundreds of millions. The video repository 116 is implemented using a database or file system, and indexing system for indexing and retrieving videos. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AV1, MP4, or MOV, and can be encoded using video codecs such as MPEG-2, MPEG-4, H.264, and the like. In addition to their audiovisual content, the videos 117 further have associated metadata 117A, e.g., textual metadata such as a title, description, and/or tags provided by a content provider 130 who uploaded the video, or obtained by an analysis of a video done by a component video hosting service 100

The video hosting service 100 further comprises a classifier training subsystem 119 that trains an accurate video classifier for a predetermined set of categories, even in the absence of a large number of pre-categorized videos to use as training examples. The trained classifier can then be applied to a given video to determine which of the categories the video represents. In one embodiment, the classifier training subsystem 119 is part of the video hosting service 100, as depicted in FIG. 1. In another embodiment, the classifier training subsystem 119 is separate from the video hosting service 100, receiving input from it and providing output to it. The classifier training subsystem 119 is described in greater detail in FIG. 2.

The service 100 may be implemented using a single computer, or a network of computers, including cloud-based computer implementations. The computers are preferably server class computers including one or more high-performance CPUs and 1G or more of main memory, as well as 500 Gb to 2Tb of computer readable, persistent storage, and running an operating system such as LINUX or variants thereof. The operations of the service 100 as described herein can be controlled through either hardware or through computer programs installed in computer storage and executed by the processors of such servers to perform the functions described herein. The service 100 includes other hardware elements necessary for the operations described here, including network interfaces and protocols, input devices for data entry, and output devices for display, printing, or other presentations of data.

Figure 2:
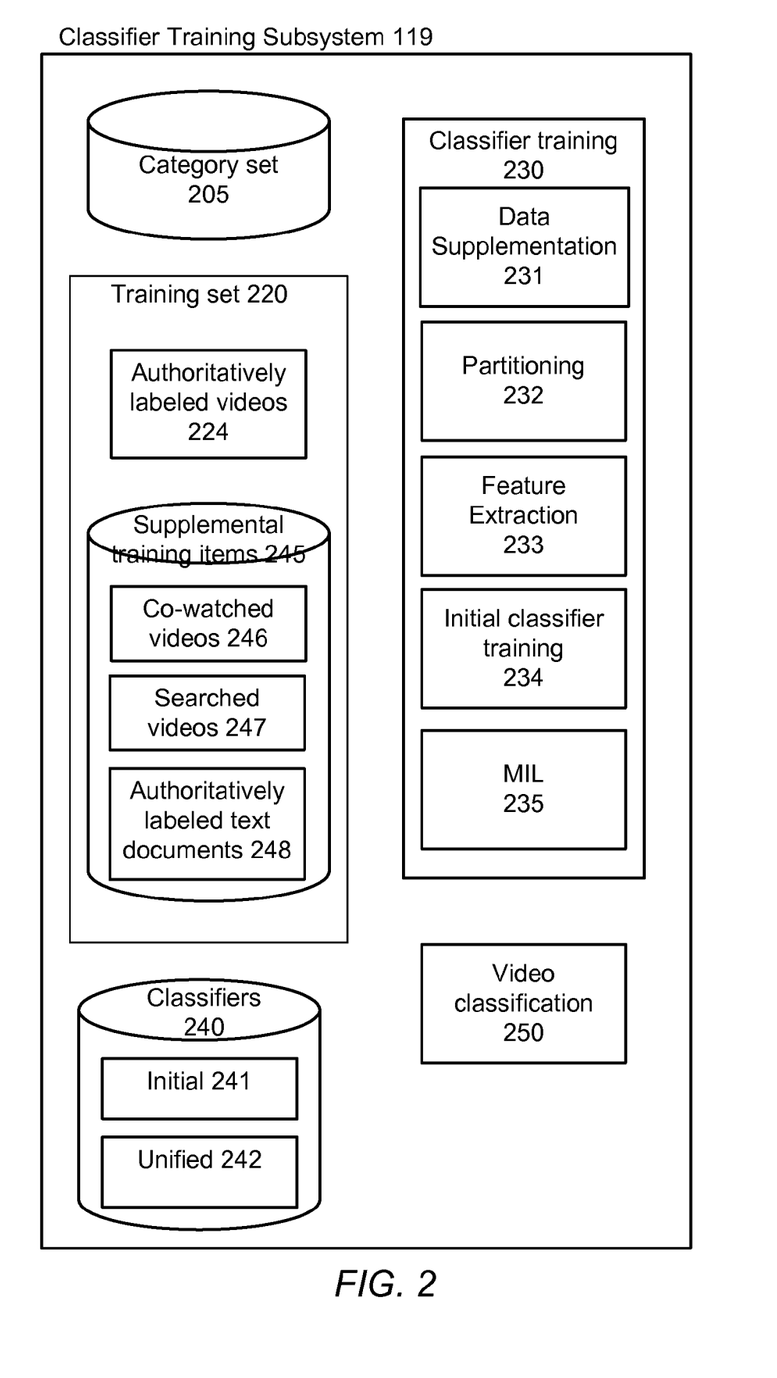
FIG. 2 illustrates the various components of the classifier training subsystem of FIG. 1, according to one embodiment.

FIG. 2 illustrates the various components of the classifier training subsystem 119, according to one embodiment. The classifier training subsystem 119 trains classifiers based in part on a set of categories and on a set of videos that have been previously authoritatively labeled by an authoritative source as representing one or more of the categories. Therefore, a labeled video is any video that has been identified as belonging to a category. This labeled may be a string, integer, or any such identifier. A video may be labeled with respect to more than one category. A labeled video may mean that it has been identified with respect to a particular category, or that it has been identified as belonging to any category. An unlabeled video, conversely, is any video that has not been identified with respect to a particular category, or that has not been identified with any category. For example, a particular video may be identified with more than one category (e.g., sports and racing), and would be considered to be labeled with respect to those categories. The video would be considered unlabeled with respect to other categories (e.g. dogs and cats). In general, this video may be considered a labeled video. As part of the training process, a module of the classifier training subsystem 119 further identifies additional training sample items, possibly of different media types, for each of the categories in addition to the labeled videos. The different media types for these training items may include—in addition to videos—textual documents such as web pages, audio, and images. Each of the additional samples is identified using one of a set of different techniques, such as identifying co-watched videos or identifying web pages authoritatively labeled as representing a particular category. In one embodiment, co-watched videos are videos played directly before or after one another by the same user. In a different embodiment, co-watched videos are videos that are indirectly played before or after one another by the same user. There may be certain temporal limit, such as all videos watched by one user within five minutes of watching a first video are co-watched with that first video. By supplementing the manually labeled videos with these additional training items, possibly including different media types, a training set of significant size can be created even where the manually labeled videos themselves are relatively few in number, thus increasing the accuracy of the trained classifiers. The combination of the labeled videos and the additional training sample items of different media types then serves as a supplemental training set that is provided as input to a classifier training algorithm. The various modules of the classifier training subsystem 119 process the supplemental training set, thereby training initial classifiers that can automatically categorize videos with a certain degree of accuracy. Output of the classifiers is then combined to train unified classifiers with still higher degrees of accuracy. The training of the unified classifiers is done using a graph algorithm that takes into account the structure of the category graph, including the relationships between neighboring categories (e.g., parent or child categories) in the graph.

More specifically, the classifier training subsystem 119 stores a predefined category set 205 representing different possible categories that a video could represent, such as "Sports," "Tennis," "Gymnastics," "Arts & Entertainment," "Movies," "TV & Video," and the like. The various categories of the category set 205 have some relationship with one or more other categories in the set, such that the set can be represented as a category graph, each node of the graph being a category, and edges between the nodes representing some relationship between the categories represented by the nodes connected by the edge. In one embodiment, the category set 205 is more specifically a taxonomy in which the categories of the graph are arranged hierarchically as a taxonomy tree, with categories being more general parents and/or more specialized children of other categories. For instance, referring to the example categories above, "Sports" could be a top-level parent category with child categories "Tennis" and "Gymnastics," and "Arts & Entertainment" could be another top-level category with child categories "Movies" and "TV & Video." The child categories may in turn have their own child categories. In general, the taxonomy may have any number of levels of any breadth or depth. In another embodiment, the category set 205 is non-hierarchical, with the nodes of the graph arbitrarily connected.

A category can be represented in various manners as would be appreciated by one of skill in the art, such as a textual label (e.g., the string "Sports") and an associated unique shorthand numerical identifier (e.g., 1). A video can be said to represent a category if the video contains some semantically understandable representation of the category within the video content itself. For example, a video represents a category "Tennis" if (for instance) there are scenes of a tennis match within the visual content of the video. A video can represent many different categories (e.g., both "Sports" and "News"), but users typically are interested in what may be considered the most salient category for the video.

In one embodiment, in order to permit training of classifiers of sufficient accuracy, each of the categories has associated with it some minimum number of training sample items. That is, although there may initially have been some large number of potential categories, the final category set 205 will include only the potential categories that have the minimum number of associated training items.

The classifier training subsystem 119 further accesses a training set 220 containing various content items, such as videos and web pages, that can be associated with various ones of the categories. The content items are labeled—either manually or automatically—with one or more of the categories from the category set 205. The content items, along with their labels, are then used to train classifiers for the various categories with which the content items are associated.

The training set 220 comprises a set of authoritatively labeled videos 224 ("authoritative videos"), previously authoritatively labeled as representing one or more categories from the category set 205, and stored in a video repository or other equivalent data store. In one embodiment, the videos are manually labeled by one or more human experts trained in the meaning and use of the category set 205; this involves the human expert viewing a representative portion of each video and then specifying which categories the video represents based on the portion viewed. In another embodiment, the authoritative labeling is performed by a labeling algorithm that categorizes videos with a high degree of accuracy. In another embodiment, a hybrid approach is used in which videos are initially categorized by a labeling algorithm, with subsequent human review and validation of some (or all) of the labels. In embodiments in which the category set 205 is represented as a taxonomy tree, in which case there will be categories that are leaf nodes of the tree, a video is labeled with the most applicable leaf node category in the taxonomy. For example, a video about tennis is labeled "Tennis," not "Sports"; the fact that the video also more generally represents sports can be inferred from the fact that "Tennis" is a child category of "Sports" in the taxonomy tree. In one embodiment, the videos which are authoritatively labeled represent a subset of the video repository 116 that was determined to be particularly popular, such as the videos most frequently viewed over a particular recent time period. Thus, in order for a category to have a threshold number associated training items in this embodiment, it must first have a sufficient number of popular videos, and then a minimum number of these popular videos must be authoritatively labeled. In other embodiments, the videos need not meet any popularity criterion prior to being labeled.

Authoritatively labeling a video, particularly when done by a human expert who watches a representative portion of the video, is time-consuming, and thus it can be slow and costly to label enough videos 224 for performing adequate classifier training. Thus, the training set 220 also beneficially comprises a set of supplemental training items 245 that can be labeled with less effort, albeit possibly with less certainty. These supplemental training items can then be combined with the authoritatively labeled videos to form a larger training set. The supplemental training set preferably includes both similar media items (e.g., other videos) as well as other types of media items (e.g., web pages, images).

Specifically, in the embodiment depicted in FIG. 2, the supplemental training items repository 245 comprises subsets of videos 246 and 247 automatically labeled based on observed relationships, and a subset of web pages 248 authoritatively labeled in a manner similar to that by which the authoritatively labeled videos 224 were labeled. It is appreciated, however, that these particular sets of items are merely representative of one embodiment, and that the supplemental training items repository 245 need not contain items of those same content types, or items labeled using the same techniques, and many contain different numbers of subsets than the three depicted in FIG. 2.

Figure 5:
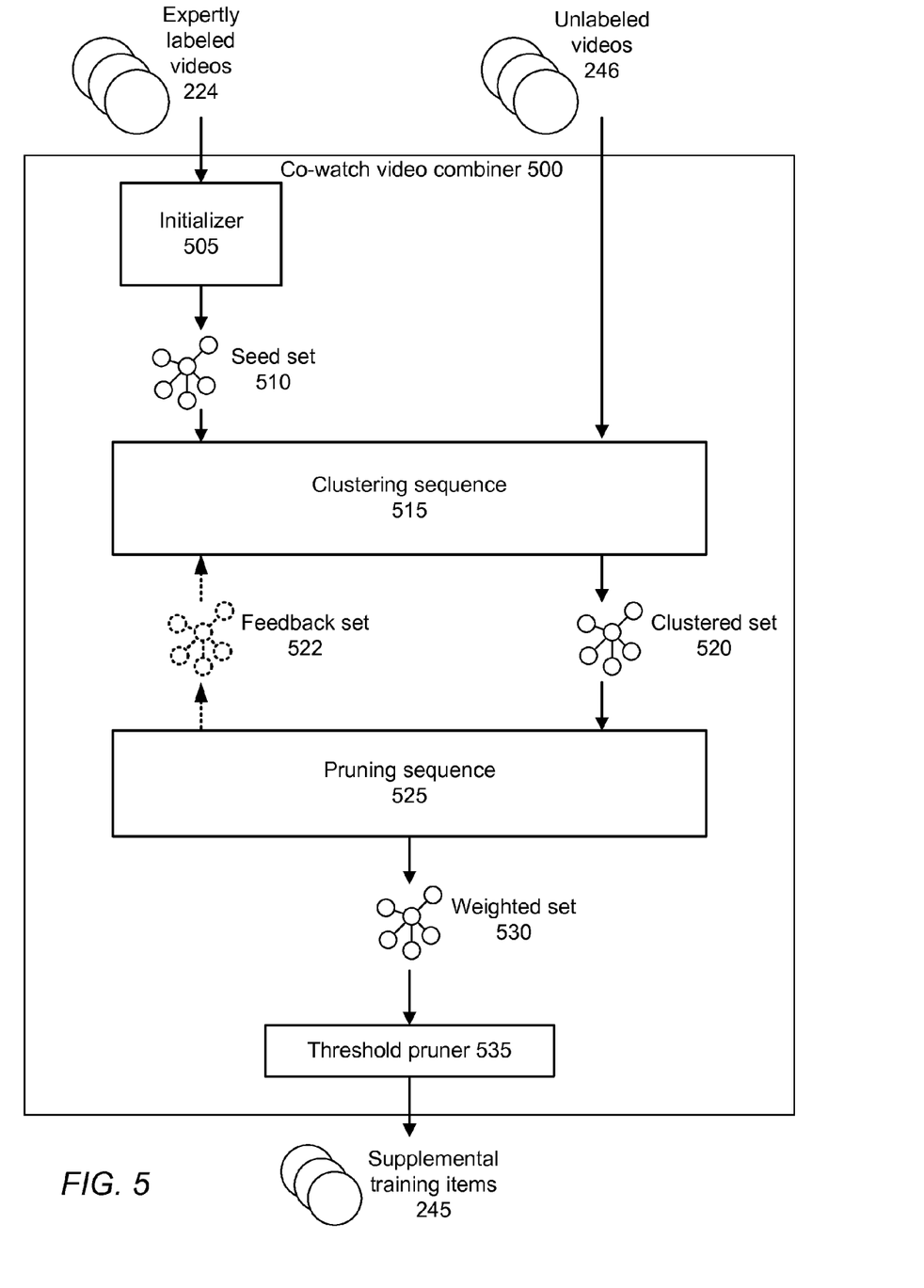
FIG. 5 illustrates the various components of the co-watch video combiner, according to one embodiment.

The videos 246 of the supplemental training set 245 are automatically labeled based on observed co-watch relationships with the authoritatively labeled videos 224 resulting from user actions. That is, for a given one of the authoritatively labeled videos 224, the videos that are played before or after it by the same user are considered "co-watched". In one embodiment, the videos 246 are generated by providing the authoritatively labeled videos 224 and the unlabeled videos to the co-watch video combiner 500. The combiner uses a graph-based analysis to form clusters of videos that are related, based on their co-watch relationships. For example, the co-watch relationship may be the number (e.g. a count) of times the two videos were co-watched by all users, a subset of users, or one user, or the time between co-watching the two videos. The co-watch relationship may also be the frequency of co-watch (e.g. the total number of co-watch events in a time period divided by the time period). The combiner then labels the videos 246 based on their associations with the clusters.

The co-watch video combiner, depicted in FIG. 5, comprises an initializer 505, a clustering sequence 515, a pruning sequence 525, and a threshold pruner 535. The authoritatively labeled videos are input into the initializer. The initializer first creates a graph having a dummy node for each category in the taxonomy tree. Then, each authoritatively labeled video is assigned to a node, and each of these nodes is attached to the dummy node corresponding to the category label of the authoritatively labeled video. For example, a video 224 labeled "Sports" is assigned to a node, which in turn is attached to the dummy node for "Sports." Assigning a video to a node may alternatively comprise associating the metadata of a video, such as its category and co-watch relationships, and/or its extracted features, such as those described below with respect to the feature extraction module 233, with a node. These groupings are output from the initializer 505 and form the seed set 510. Thus, for each category node in the taxonomy tree there will be attached a node for an authoritatively labeled video 224 for that category, which serves as the seed for a cluster. In various embodiments, the cluster comprises a group of nodes connected by edges. Each node connects to at least one other node with an edge, but does not necessarily connect to all other nodes. During the clustering and pruning processes described below, the nodes and edges are given weights based on the co-watch relationship between the two videos represented by the two nodes attached to the edge. Nodes are added and removed from the seed set based on these weights.

The seed set 510 and the unlabeled videos 246 are then passed into the clustering sequence 515. The clustering sequence 515 sorts the unlabeled videos by clustering them around the seed clusters based on co-watch relationships. In general, any two co-watched videos will be connected. In this manner, an unlabeled video is assigned to a cluster if it is co-watched with an authoritatively labeled video in that cluster seed some minimum number of times; the minimum can be one, or some higher value. Other assignment functions based on the co-watch values can also be used for cluster assignment. For each edge in the cluster, the clustering sequence 515 assigns a weight to that edge based on the co-watch relationship of the two nodes connected to that edge. For example, the co-watch relationship may be the number (e.g. a count) of times the two videos were co-watched.

The clustering sequence 515 outputs the clustered sets 520. The pruning sequence 525 takes the clustered sets 520 and prunes them. In one embodiment, the pruning sequence determines, for each video node, a cluster score, and removes the video if it is outside a threshold. This threshold may be a maximum (i.e. the cluster score must be below 10), a minimum (i.e. the cluster score must be above 10), or one or more acceptable ranges (i.e. the cluster score must be between 10 through 20 or 30 through 50). For example, the cluster score may be a number of edges to other nodes, and the pruning sequence 525 then identifies and removes nodes in the cluster with less than a minimum number of edges to other nodes (e.g., fewer than 2). In other words, the cluster score for a video may be the number of unique co-watch videos for that video. Alternatively, the pruning sequence 525 applies the text classifier 241 for the category associated with the cluster to the nodes, where the score from the text classifier is the cluster score, and then removes those nodes with a low text classifier score (e.g., lower than 0.5).

After pruning, each of the nodes in a cluster is given a cluster score in the form of a weight. This weight is the sum of weights of the incident edges to the node. Alternatively, the weight is based on the sum of the weights of each of the node's neighbors modified by the weight of the respective incident edge. In this way, the weight is propagated from the authoritatively labeled videos to the unlabeled videos. The total weight represents the likelihood that the video at that node belongs to the category represented by the cluster. This set of weighted videos 530 is then sent to the threshold pruner 535.

The threshold pruner 535 analyzes each of the weighted videos. If the video has a weight lower than some threshold (e.g., 85%), the threshold pruner removes it from the cluster. The remaining videos are labeled with the selected category (ies) and are output as additional training data 245.

Feedback between the clustering sequence 515 and the pruning sequence 525 may be used to optimize the clustering process by pruning unrelated nodes prior to reclustering. In other words, the clustering and pruning steps can be done iteratively. One feedback method is a dense partitioning algorithm, such as described in *A Local Algorithm for Finding Dense Subgraphs* by Andersen, in the proceedings of the 19th Annual ACM-SIAM Symposium on Discrete Algorithms, pages 1003-1009, 2008. In these instances, only a portion (e.g., 10% to 25%) of the unlabeled videos 246 are input to the clustering sequence 515 initially, rather than all of the unlabeled videos 246. These videos are clustered and output as the clustered set 520. The clustered set 520 is then fed to the pruning sequence 525. The pruning sequence then prunes the input set, and outputs the pruned set as the feedback set 522. The clustering sequence 515 then accepts the feedback set 522 in place of the seed set 510, as well as another portion of the unlabeled videos 246. The clustering sequence 515 then outputs a new cluster set 520 based on the feedback set 522 and the new portion of the unlabeled videos 246. This new cluster set 520 is fed into the pruning sequence 525. The pruning sequence outputs a new feedback set 522 based on the new cluster set 520. The feedback set acts like a "seed set" for repeated iterations of the cycle. Once all of the unlabeled videos 246 have been processed in this manner, then the pruning algorithm outputs the weighted set 530 and the system operation continues as above.

The searched videos 247 of the supplemental training set 245 are automatically labeled based on the results of video search engines, such as those of YOUTUBE™. That is, each category label is provided as input to a video search engine, and a set of videos is identified as a result. For example, the category label "Tennis" is entered, and the video search engine provides a set of videos determined to represent tennis. The category is then applied as a label to each of the videos in the search result set. In one embodiment, a maximum of 5,000 such videos is labeled for each category, including the videos found to be representative of child categories. (E.g., videos for "Tennis" are included among the videos associated with "Sports.") Using the video search engine itself to obtain videos associated with the categories considerably speeds up the creation of a robust training set, and leverages the categorization knowledge that is embedded within the video search engine.

The authoritatively labeled text documents 248 of the supplemental training set 245 contain primarily textual content, and in one embodiment comprise web pages from various web sites. In other embodiments, the text documents 248 additionally and/or alternatively comprise other types of documents with significant textual content, such as word processing files, pure text files, and the like. The text documents 248 may contain non-textual elements, such as backgrounds, images, etc., in addition to their purely textual portions. The text documents 248 are labeled in the same manner as the authoritatively labeled videos 224. That is, a human expert (for example) examines a text document, such as a web page, and labels it with the label of one or more of the categories of the category set 205. However, since a textual document such as a web page can typically be analyzed much more quickly than a video, which must be watched for some not insignificant period of time before it can be classified, the authoritatively labeled web pages 248 can be labeled with far less cost and effort and can thus include a far greater number of items. In one embodiment, the text documents are tentatively labeled by an automated process, such as a computer program that assigns the tentative labels based on metadata keywords, and the human experts review the tentative labels, accepting or rejecting them as appropriate.

Thus, the training set 220 includes content items obtained using different techniques, such as manual labeling, automatic identification of co-watched videos, and execution of queries on a video search engine. Additionally, the content items may be of different content types, such as video and text, which have different content properties—that is, videos have both audiovisual content and also textual content (e.g., associated textual metadata), whereas text documents have only textual content.

The various items of the training set 220 need not be equally distributed amongst the various categories of the category set 205. Rather, different categories may have different numbers of corresponding items. In one embodiment, categories lacking some threshold number of items—e.g., at least 50 authoritatively labeled videos 224—are discarded for purposes of future classifier training. Thus, for example, although the category set 205 might originally have a thousand distinct categories, only a small number of categories (e.g., 30) might have a sufficient number of associated training items 220 to be included in the classifier training The labeling of the various training items 220 can be implemented in various manners in different embodiments. For example, each content item can be associated with some representation of the one or more categories that it represents, e.g., via a list of the shorthand numerical identifiers for the various categories. Alternatively, the association could be reversed, with each category being associated with identifiers of the associated content items, such as video identifiers, URLs of web pages or other textual documents, and the like. The associations may be stored in any type of data structure that makes access and analysis of the labels efficient. The labels can be stored with the metadata of each item 220, or in a separate table, array, index, tree, or other structure.

It is appreciated that the content of the training set 220 need not wholly or even partially be physically present within the classifier training subsystem 119 of the video hosting service 100. For example, in one embodiment one or more of the authoritatively labeled videos 224 and the supplemental training items 245 are stored on computing systems remote from the video hosting service 100, and the classifier training subsystem 119 accesses them from their remote locations. For example, the authoritatively labeled text documents 248 may be stored remotely on websites 125 from which they originate, with the training set 220 only including a reference such as an URL pointing to the text documents 248 and labels corresponding to categories of the category set 205 that the text documents represent. The various videos 224, 246, 247 could likewise be stored remotely.

The classifier training subsystem 119 further comprises a classifier repository 240 containing the classifiers learned based on the content items of the training items repository 220. Specifically, the classifier repository 240 comprises initial classifiers 241 that result from training on combinations of the authoritatively labeled videos 224 with each of the supplemental training items 245, such as the combination of the authoritatively labeled videos 224 and the co-watched videos 246, and the combination of the authoritatively labeled videos 224 and the authoritatively labeled text documents 248. The classifier repository 240 additionally comprises unified classifiers 242 that result from application of a machine-learning-based multiple instance learning (MIL) process to the results of the various initial classifiers 241. In this manner, the initial classifiers 241 represent preliminary classifiers that are used to produce the final, more effective unified classifiers 242. Each of the initial classifiers 241 is associated with one of the categories in the category set 205 and, when applied to a video, provides a measure of how strongly the video represents that category. For example, an initial classifier 241 for the category "Tennis" provides a score measuring how strongly a given video represents the sport of tennis, e.g., based on the audiovisual content of the video and/or its textual metadata 117A. In one embodiment, a classifier produces Boolean scores representing whether or not a given video represents the category of the classifier; in another embodiment, a classifier produces a real number scalar (e.g., ranging from 0.0 to 1.0) representing how strongly (e.g., a measure of likelihood or probability) the video represents the categories, and numbers greater than some threshold can be considered to mean that the video represents the category.

The classifier training subsystem 119 further comprises a classifier training module 230 that analyzes the content items in the training set 220 and trains the set of unified classifiers 242 that can be used to automatically categorize videos.

Specifically, the classifier training module 230 comprises a data supplementation module 231 that identifies certain ones of the supplemental training items 245 and adds them to the training set 220. For example, in one embodiment the data supplementation module 231 examines an access log of the video hosting service 100 to determine which videos were co-watched, and compares these videos to the authoritatively labeled videos 224 to identify the set of co-watched videos 246. Similarly, the data supplementation module 231 performs queries of the video search module 106 using each category label of the category set 205 to identify the searched videos 247.

The classifier training module 230 further comprises a partitioning module 232 that partitions the labeled content items of the training items repository 220—that is, the authoritatively labeled videos 224 and supplemental training items 245—into positive and negative training subsets based on their labels. (As previously noted, the co-watched videos 246 and the searched videos 247 inherit the labels of the authoritatively labeled videos 224 to which they are related.) Thus, for each content item in the set of training items 220, and for each category in the category set 205, the partitioning module 232 partitions the training items into some positive subset of items representing the category and some negative subset of items not representing the category. In an embodiment in which the category set 205 is structured as a hierarchical taxonomy, the documents representing the category are defined to be the documents labeled as representing either the category or one of its descendant categories (i.e., any child subcategory of the category, or any subcategories of a subcategory, etc.). The documents not representing the category are then derivatively defined to be the documents not in the positive subset.

Thus, referring to the above category examples, the partitioning module 232 could partition the training items 220 into a positive subset of content items representing "Sports" and a negative subset of documents not representing "Sports," a positive subset representing "Tennis" and a negative subset not representing "Tennis," and so forth, for each category in the category set 205. These training subsets can then be used by an initial classifier training module 234 to train the initial classifiers 241, as described below.

The classifier training module 230 further comprises a feature extraction module 233 that extracts relevant features from the various training items 220, an initial classifier training module 234 that trains a number of initial classifiers 241 for the various categories within the category set 205 using the features extracted by the feature extraction module 233, and a MIL module 235 that trains the unified classifiers 242 based in part on values produced by the initial classifiers 241. These modules are now described in further detail.

The feature extraction module 233 extracts features from the content items of the training items repository 220, the features serving as descriptive representations of their respective content items for use in learning category classifiers. The types of features differ based on the type of the content item from which they are extracted. For example, in the case of text documents from the authoritatively labeled text documents 248, the feature extraction module 233 extracts textual features from the contents of the documents. In one embodiment, the textual features that are extracted are weighted text clusters obtained from Noisy-Or Bayesian networks. (For more details, see, for example, *Learning Bayesian Networks* by R. E. Neapolitan, Prentice Hall, 2003, which is hereby incorporated by reference.) These same textual features can also be extracted from the textual metadata of the videos 224, 247, 248 (e.g., from the title, description, and keywords associated with a video), although their descriptive power tends to be less than in the case of the labeled text documents 248, given the lesser amount of text in video metadata compared to that in a text document.

The feature extraction module 233 additionally extracts various features from video content of the videos 224, 247, 248. For example, in various embodiments the types of features include one or more of the following:

A color histogram computed using hue and saturation in HSV color space;
Color motion defined as the cosine distance of color histograms between two consecutive frames;
Skin color features;
Edge features using edges detected by a Canny edge detector in regions of interest;
Line features using lines detected by a probabilistic Hough Transform;
A histogram of local features using Laplacian-of-Gaussian (LoG) and SIFT (Scale Invariant Feature Transform);
A histogram of textons;
Entropy features for each frame using a normalized intensity histogram and entropy differences for multiple frames;
Facial features such as a number of faces, or the size and aspect ratio of largest face region, with faces being detected by an extension of the AdaBoost classifier;
Shot boundary detection based features using differences of color histograms from consecutive frames;
Audio features such as audio volume and 32-bin spectrogram in a fixed time frame centered at the corresponding video frame; and
"Adult" content features based on a boosting-based classifier in addition to frame-based adult-content features.

Audio and visual features are extracted in the same time interval. Then, a 1D Haar wavelet decomposition is applied to the extracted features at 8 scales. Instead of using the wavelet coefficients directly, the maximum, minimum, mean and variance of the wavelet coefficients are used the features in each scale. This multi-scale feature extraction is applied to all of the audio and video content features, except the histogram of local features.

It is appreciated that numerous types of data could be extracted as features of a text document or a video, according to techniques known to one of skill in the art, and the above-described features are merely illustrative of the techniques of one embodiment.

The initial classifier training module 234 trains the various initial classifiers for each category of the category set 205. Different initial classifiers are trained based on the different combinations of the authoritatively labeled videos 224 with the various subsets of the supplemental training items 245. For example, in the embodiment depicted in FIG. 2, in which the supplemental training items 245 comprise a subset of co-watched videos 246, a subset of searched videos 247, and a subset of authoritatively labeled text documents 248, initial classifiers are trained for the three combinations of the authoritatively labeled videos 224 with each of these three subset. Further, for each combination, classifiers may be learned based on the types of features obtainable from the combination. For example, the two combinations of the videos 224 with the videos 246 and 247 each support both audiovisual features and text features, since videos have both audiovisual content and textual metadata, and thus both audiovisual and textual classifiers 241 are trained. In contrast, the combination of the videos 224 with the text documents 248 supports only textual features, since the text documents 248 lack audiovisual content, and thus only textual classifiers are trained. Thus, in the embodiment of FIG. 3, five distinct initial classifiers 241 are trained for each analyzed category: (1) an audiovisual classifier and (2) a textual classifier trained from the combination of the authoritatively labeled videos 224 with the co-watched videos 246; an (3) audiovisual classifier and a (4) textual classifier trained from the combination of the authoritatively labeled videos 224 with the searched videos 247; and a (5) textual classifier (only) trained from the combination of the authoritatively labeled videos 224 with the authoritatively labeled text documents 248. Thus, in this embodiment each of the K categories has 5 distinct classifiers associated with it, and so there are 5K distinct classifiers in total. As noted, in one embodiment classifiers are trained only for categories having a sufficient number of associated training items, e.g., at least 50 authoritatively labeled videos 224.

More specifically, for each analyzed category of the category set 205, the initial classifier training module 234 provides the features extracted by the feature extraction module 233 from the positive and negative training subsets produced by the partitioning module 232 as input to a training algorithm. In one embodiment, the AdaBoost training algorithm is used for training the classifiers 241 based on audiovisual features from video content, and the support vector machine (SVM) algorithm is used for training the classifiers based on textual features (i.e. the textual features extracted the textual metadata of videos 224 and from the content of text documents 248) where there are 10,000 or fewer content items for training, and the LibLinear algorithm where there are more than 10,000 content items.

With the various initial classifiers 241 trained, a MIL module 235 then trains the unified classifiers 242 based (in part) on the combined outputs of the classifiers. The training of the unified classifiers takes into account relationships between neighboring categories in the category graph, and also combines training items from different sources and possibly different content domains (e.g., video, text, audio). The unified classifiers 242 may then be applied to an arbitrary video (or, in other embodiments, to another type of media item of interest), producing as output a score for each of the categories of the category set 205, the scores measuring how strongly the video represents that category. In one embodiment, the MIL module 235 is an adaptation of the MILBoost algorithm described in P. Viola, J. Platt, and C. Zhang. *Multiple instance boosting for object detection*, in *Advances in Neural Information Processing Systems* 18, pages 1417-1424, MIT Press, Cambridge, Mass., 2006. Further details on the MIL module 235 are provided below with respect to FIG. 4.

The classifier training subsystem 119 optionally comprises a video classification module 250 that applies the initial classifiers 241 and the unified classifiers 242 produced by the classifier training module 230 to determine categories of the category set 205 that are applicable to a given video. Discussion of the use of the video classification module 250 is provided below.

Overall Process

Figure 3:
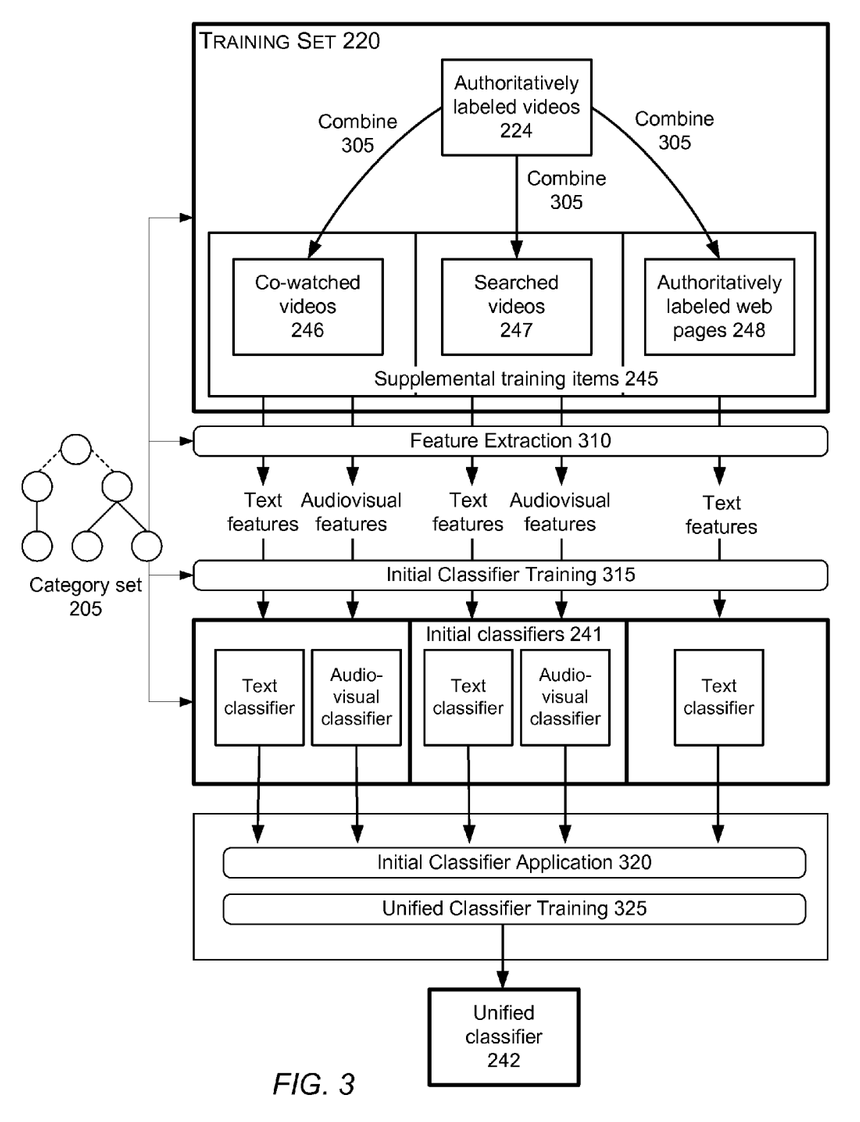
FIG. 3 is a data flow diagram representing the relationships and derivations of the various types of data analyzed and/or produced by the training subsystem, according to one embodiment.

FIG. 3 illustrates the relationships between the various modules described above, and data processing involved in the process of deriving the unified classifiers 242, according to one embodiment.

The process begins with the authoritatively-labeled videos 224, each of which has been authoritatively labeled as representing one or more categories of the category set 205. The supplemental training items 245 are then added to the authoritatively labeled videos 224, thereby forming the training set 220. In one embodiment (depicted in FIG. 3), the supplemental training items 245 include co-watched videos 246, searched videos 247, and authoritatively labeled web pages 248, as described above with respect to FIG. 2. Video items 246 and 247 inherit the same category labels as the authoritatively labeled videos 224 to which they are related; the authoritatively labeled web pages 248 are independently labeled, such as by human experts or labeling algorithms.

Specifically, the authoritatively labeled videos 224 are combined 305 with each of the sets of supplemental training items 246-248. For example, assuming there are $N_1$ authoritatively labeled videos 224 and $N_2$ co-watched videos 246, they are combined into a first combined set having $N_1+N_2$ items. For each category of the category set 205, appropriate features are then extracted 310 from the media items of each of the combined sets that represent the category, and an initial classifier 241 is trained 315 based on those features. Features are said to be appropriate for a combined set if they are of a type obtainable from both the authoritatively labeled videos 224 and the other set of supplemental training items 245 in the combination. For example, since both the authoritatively labeled videos 224 and the co-watched videos 246 are videos having both textual features (e.g., from textual metadata) and audiovisual features, both a text classifier and an audiovisual classifier are trained for the combination of videos 224 and 246. Thus, in the embodiment of FIG. 3, there are—for every category—five distinct initial classifiers: textual and audiovisual classifiers trained from features of the combination of videos 224 and 246; textual and audiovisual classifiers trained from features of the combination of videos 224 and 247; and a textual classifier trained from features of the combination of videos 224 and web pages 248.

Each of the initial classifiers 241 is then applied 320 to score each of the media items in the training set 220. The set of scores of the various media items, along with the corresponding labels, are provided as input to the MIL module 235, which fuses the data together, training 325 a single unified classifier 242 for each of the categories 205. More specifically, the training 325 results in learning of model parameters, as described in more detail below with respect to FIG. 4. These parameters can then be used in conjunction with the other input data to infer the categories represented by an arbitrary video 320, as described in more detail below with respect to FIG. 4.

It is appreciated that the steps of FIG. 3 need not be performed in the exact order described. For example, the feature extraction 310 could be performed before the subsets of the training set 220 are combined, and the combination could combine only the extracted feature vectors. Similarly, the features need not be extracted 310 from all the combinations of the training set 220 before training 315 is performed; rather, extraction and training could be performed for one combination at a time, before proceeding to the next combination. Similarly, some of the steps could occur partially or entirely in parallel on different processing units (e.g., different machines, different processors of a single machine, or different cores of a single processor).

It is further appreciated that the unified classifiers 242 need not apply solely to digital videos, but in different embodiments applies to different types of media items, such as audio files, image files, textual files such as web pages, and the like. The process for training the unified classifier 242 in these embodiments is analogous to that disclosed above for training the unified classifiers 242 to categorize videos. That is, with the exception of possibly using different types or numbers of subsets within the training set 220 and extracting different types of feature vectors for different types of media items, the process is fundamentally the same in all such embodiments.

Unified Classifier Training and Application

Figure 4:
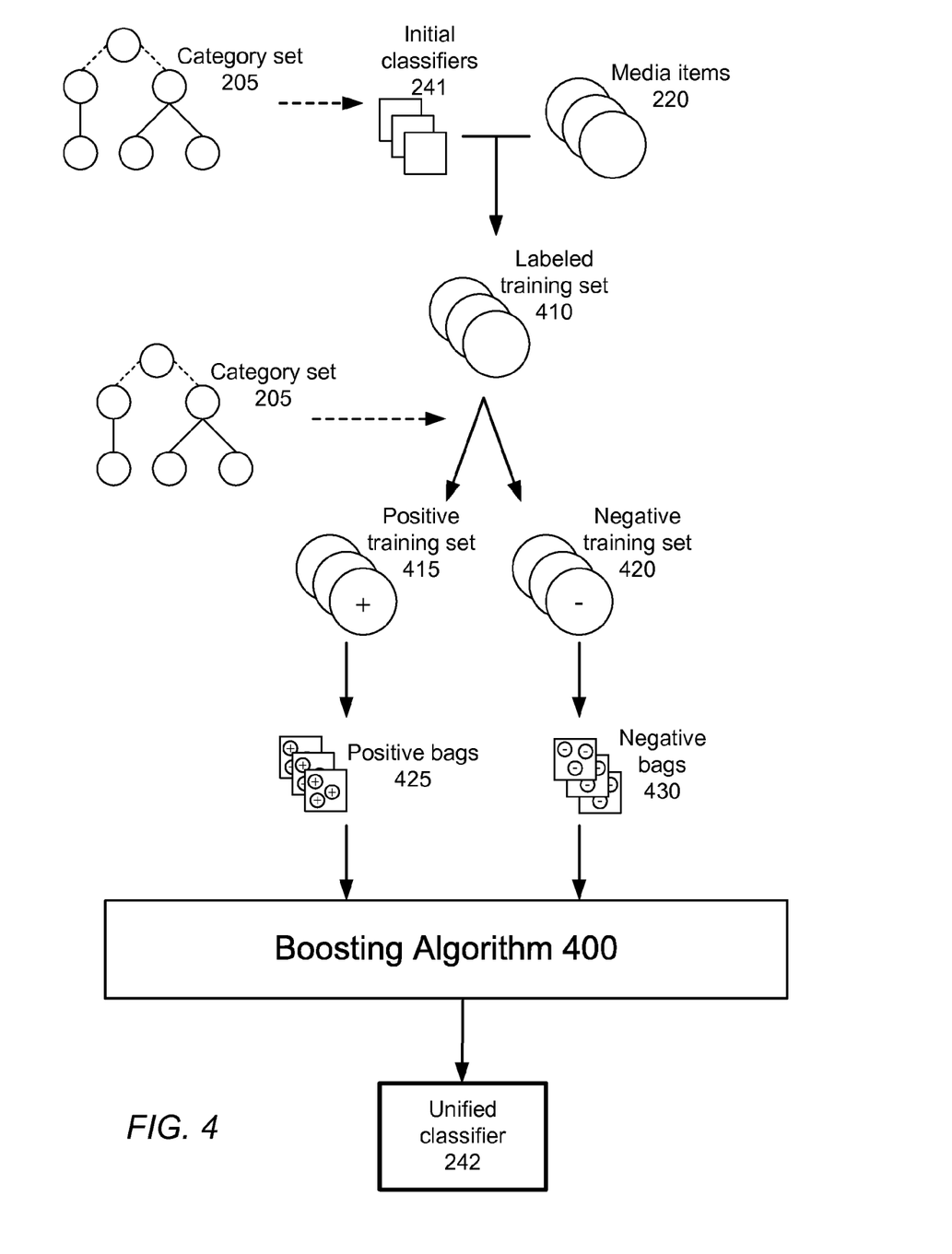
FIG. 4 is a data flow diagram representing the inputs and outputs of processes for training and for applying a unified classifier, respectively, according to one embodiment.

FIG. 4 is a data flow diagram representing the inputs and outputs of processes for training and for applying the unified classifiers 242, respectively, according to one embodiment.

As noted, the unified classifiers 242 of FIG. 2 are trained by the MIL module 235. The MIL module 235 applies the initial classifiers 241 to each of the media items in the set of training items 220. In various embodiments, the training items 220 may be a superset of the training set used to train the initial classifiers, it may be a subset of the training set used to train the initial classifiers, or it may be a completely different set than the training set used to train the initial classifiers. For each media item, the classifiers 241 produce a set of M*K scores, where there are K categories and M distinct classifiers per category. The set of scores is linearized to form a feature vector for the media item. Then, machine learning methods of a MIL algorithm are applied to these feature vectors, to the known category labels of the media items of the training items 220, and to the graph of the category set 205 to calculate parameter values used in the unified classifiers 242. More detail on the MIL module 235 is now provided.

As noted above, in one embodiment, the MIL module 235 implements an adaptation of the MILBoost algorithm, which is a combination between a multiple instance learning algorithm and a boosting algorithm, such as AdaBoost, used for object detection in images.

In this embodiment, for each category in the category set 205, the MIL module receives the M scores for each content item, and determines whether that content item should be labeled with that category. To make this determination, the MIL module can use aggregation function (e.g., average) of the M scores to obtain an overall category score. If the overall score is above a threshold then the content item is determined to be in the category. The MIL module may instead use a weighted linear combination of the M scores. The MIL module then labels each content item with a classification score vector indicating which category(ies) the content item belongs in. For each category, the score can be a Boolean score (i.e. True or False, or 1 or 0), or it can be an integer or floating point score (i.e., +1 means the content items is labeled with the category, −1 means the content item is not labeled with the category). The set of content items labeled with the classification score vectors makes up the labeled training set 410.

Referring now to FIG. 4, in this embodiment, for a category in the category set 205, the MIL module 235 divides the labeled training set 410 into a positive training set 415 and a negative training set 420. The positive training set includes all members of the labeled training set that have been labeled with the category, and the negative training set includes all members of the labeled training set that have not been labeled with the category. For example, if the category of interest were "Sports," then all members of the labeled training set that were labeled with "Sports" (e.g., being labeled with a +1, or a True, for the Sports category) would be in the positive training set. All the members of the labeled training set that were not labeled with "Sports" (e.g., being labeled with a −1, or a False, for the Sports category) would be in the negative training set. A member of the positive training set may be labeled with more than one label, but it must have the label of the category of interest. Each category may have a different positive and negative training set. In various embodiments, the MIL module may perform the following steps for all categories in parallel, or it may perform the steps for each category in series.

The MIL module 235 divides the positive 415 and negative 420 training sets into the positive bags 425 and the negative bags 430, respectively. A bag is a container, virtual or otherwise, that contains a subset (e.g., one or more members) of the training sets. In some embodiments, each member gets assigned to one bag. In other embodiments, members may be part of multiple bags. A positive bag contains members of the positive training set, and a negative bag contains members of the negative training set. In some embodiments, the positive bags may contain members of both the positive and the negative training sets, and the negative bags may contain members of both the positive and the negative training sets. In other embodiments, the positive bags contain only members of the positive training set, and the negative bags contain only members of the negative training set. All bags do not have to have the same number of members. For example, a subset of positive bags may have 10 members, and a different subset of positive bags may have 5 members. The negative bags do not have to have the same number of members as the positive bags. For example, all positive bags could have 10 members, and all negative bags could have 5 members. The use of the bags is advantageous, as it allows the MIL module to produce a unified classifier that is better able to handle noise in the training data. The multiple instance learning algorithm used here operates with the minimal constraint that every positive bag will have at least one true positive, and that every negative bag will have at least one true negative, regardless of the number of false positives or false negatives in the bag. Even in situations where the training set has numerous false positives and false negatives, this constraint will hold for most of the bags. This means that the boosting algorithm below will only be training on false positives and false negatives when a bag contains all false positives or false negatives, as opposed to previous solutions, where the boosting algorithm would be training on false positives and false negatives when any members of the training set are mislabeled. The MIL module 235 then sends the positive bags 425 and negative bags 430 to the boosting algorithm 400. The boosting algorithm uses the bags to determine a unified classifier. The boosting algorithm may be the AdaBoost algorithm, BrownBoost algorithm, or any other boosting algorithm.

First, the boosting algorithm 400 identifies a first set of weights, comprising a weight for each of the bags. In various embodiments, the boosting algorithm may additionally calculate weights for each of the videos in a bag, and use these weights to determine the weight of the bag. These weights may be adjusted if the number of positive bags is different from the number of negative bags. Using the bags and their respective weights, the boosting algorithm determines a first weak classifier. The boosting algorithm may then determines a second set of weights for the bags, and from these weights, the boosting algorithm would determine a second weak classifier. In various embodiments, the boosting algorithm continues to determine sets of weights and additional weak classifiers. The boosting algorithm can determine any number of weak classifiers. Once the boosting algorithm has determined all the weak classifiers, the boosting algorithm produces a linear combination of the weak classifiers to determine unified classifier 242.

For each category in the category set 205, The MIL module 235 repeats the steps of converting the labeled training set 410 into the positive 415 and negative 420 training sets, and then on to the positive 425 and negative 430 bags, and then applying the boosting algorithm 400. Therefore, there will be a separate unified classifier 242 for each category.

This application of boosting is advantageous, because it is often easier to directly create a weak classifier than a strong classifier. Boosting allows the MIL module to train numerous weak classifiers, and then combine them to indirectly produce a strong unified classifier.

Uses of the Trained Classifiers

After the training process is complete, the unified classifiers 242 can, when applied to a video (e.g., by the video classification module 250), produce a score for every category of the set of categories 205. The unified classifiers 242 may then be applied to categorize videos 117 from the video repository 116 that do not already have authoritatively applied category labels. The unified classifiers 242 are provided, as input, with the same type of information that was used to train them—that is, feature vectors of classifier scores. Thus, for each category 205 and for each of the initial classifiers 241—e.g., the five initial classifiers of the example of FIG. 3—the initial classifiers 241 are applied to the input video, producing a feature vector of scores. This feature vector of scores is then provided to each of the unified classifiers 242 as depicted in FIG. 4, and the set of category scores is produced as output. In one embodiment, the video is assigned a category label for each category for which the associated unified classifier 242 produces a score above some threshold level indicating sufficient certainty that the video is indeed representative of the category.

In another embodiment, only the top-scoring C categories are used to label the video, for some integer C. In one embodiment, if the category set 205 is a taxonomy tree, a video is not assigned a label with a general parent category having a child sub-category that also applies. For example, if the classifiers for both the "Sports" category and its "Tennis" child category output scores for a given video above the threshold level, the video would be labeled with "Tennis" but not with "Sports," since the latter can be inferred from the former. In another embodiment, any category for which the associated unified classifier 242 produces a score for a video above some threshold level has its label assigned to the video, regardless of its parent/child relationships with other categories.

The category labels assigned to a video can then be used in various ways by users of the video hosting service 100. For example, the labels of the determined categories can be viewed along with other metadata of a video, e.g., appearing as video tags for the video when viewed in a web-based user interface of a video sharing site. The labels can also be used to browse videos of a particular type, such as showing all videos that were assigned labels of a chosen category, such as "Tennis." The category can be chosen in various ways, such as by direct user selection of a category. Alternatively, the category can be chosen by user selection of a document from which the category can be inferred, such as by application of the initial classifiers to a textual document, by application of the unified classifier to a video, or the like, thus implementing "show videos like this document" functionality. Similarly, they can be integrated into more sophisticated search functionality as one input, such as a search for videos of a particular category and having other additional attributes, such as particular text in their titles, a creation date within a given timeframe, or the like. The possible uses of the assigned category label are numerous, and are not limited to these specific examples.

This disclosure has described in particular detail one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms or features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present invention as described herein, and any references to specific languages are provided for invention of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the apparatuses, methods, and computer-readable storage media, which are set forth in the following claims.

What is claimed is:

1. A method, executed by a computer system, of forming a unified classifier for a category, the method comprising:
   storing a taxonomy of categories, the categories for labeling videos;
   accessing a video repository;
   retrieving from the video repository a training set of videos for a category from the taxonomy of categories, the training set comprising a positive training set of videos labeled with the category, and a negative training set of videos not labeled with the category;
   forming a plurality of positive bags, each positive bag comprising a plurality of the videos from the positive training set;
   forming a plurality of negative bags, each negative bag comprising a plurality of the videos from the negative training set;
   applying a boosting algorithm to obtain a plurality of sets of weights, wherein each set of weights comprises one weight for each bag, the weight for each bag based on a weight of each video in the plurality of videos in the bag;
   training a unified classifier, wherein training the unified classifier is based at least in part on the plurality of positive bags, the plurality of negative bags, and the plurality of sets of weights; and
   storing the unified classifier.

2. The method of claim 1, wherein the videos of the positive training set include false positives and true positives with respect to the labeled category, and each of the positive bags comprises at least one true positive video and at least one false positive video.

3. The method of claim 1, wherein each video is associated with a feature vector determined by a set of initial classifiers, and training the unified classifier based on the plurality of positive bags and plurality of negative bags comprises training the unified classifier based on the feature vectors associated with the videos in the plurality of positive bags and the plurality of negative bags.

4. The method of claim 3, further comprising training the set of initial classifiers, the set of initial classifiers including a first initial classifier trained using a first initial positive training set comprising co-watched videos with a group of authoritatively labeled videos, and a second initial classifier trained using a second initial positive training set comprising search videos and the group of authoritatively labeled videos.

5. The method of claim 3, further comprising training the set of initial classifiers, the set of initial classifiers including a first initial classifier trained using a first initial training set comprising videos, and a second initial classifier trained using a second initial training set comprising non-video media.

6. The method of claim 5, wherein the non-video media is selected from the group consisting of textual documents, audio, images, and any combination thereof.

7. A system for forming a unified classifier for a category, the system comprising:
   a computer processor, the computer processor configured to:
   store a taxonomy of categories, the categories for labeling videos;
   access a video repository;
   retrieve from the video repository a training set of videos for a category from the taxonomy of categories, the training set comprising a positive training set of videos labeled with the category, and a negative training set of videos not labeled with the category;
   form a plurality of positive bags, each positive bag comprising a plurality of the videos from the positive training set;
   form a plurality of negative bags, each negative bag comprising a plurality of the videos from the negative training set;
   apply a boosting algorithm to obtain a plurality of sets of weights, wherein each set of weights comprises one weight for each bag, the weight for each bag based on a weight of each video in the plurality of videos in the bag;
   train a unified classifier, wherein training the unified classifier is based at least in part on the plurality of positive bags, the plurality of negative bags, and the plurality of sets of weights; and
   store the unified classifier.

8. The system of claim 7, wherein the videos of the positive training set include false positives and true positives with respect to the labeled category, and each of the positive bags comprises at least one true positive video and at least one false positive video.

9. The system of claim 7, wherein each video is associated with a feature vector determined by a set of initial classifiers, and training the unified classifier based on the plurality of positive bags and plurality of negative bags comprises training the unified classifier based on the feature vectors associated with the videos in the plurality of positive bags and the plurality of negative bags.

10. The system of claim 9, wherein the computer processor is further configured to train the set of initial classifiers, the set of initial classifiers including a first initial classifier trained using a first initial positive training set comprising co-watched videos with a group of authoritatively labeled videos, and a second initial classifier trained using a second initial positive training set comprising search videos and the group of authoritatively labeled videos.

11. The system of claim 9, wherein the computer processor is further configured to train the set of initial classifiers, the set of initial classifiers including a first initial classifier trained using a first initial training set comprising videos, and a second initial classifier trained using a second initial training set comprising non-video media.

12. The system of claim 11, wherein the non-video media is selected from the group consisting of textual documents, audio, images, and any combination thereof.

13. A non-transitory computer-readable storage medium having executable computer program instructions embodied therein for forming a unified classifier for a category, actions of the computer program instructions comprising:
   storing a taxonomy of categories, the categories for labeling videos;
   accessing a video repository;
   retrieving from the video repository a training set of videos for a category from the taxonomy of categories, the training set comprising a positive training set of videos labeled with the category, and a negative training set of videos not labeled with the category;
   forming a plurality of positive bags, each positive bag comprising a plurality of the videos from the positive training set;
   forming a plurality of negative bags, each negative bag comprising a plurality of the videos from the negative training set;
   applying a boosting algorithm to obtain a plurality of sets of weights, wherein each set of weights comprises one weight for each bag, the weight for each bag based on a weight of each video in the plurality of videos in the bag;
   training a unified classifier, wherein training the unified classifier is based at least in part on the plurality of positive bags, the plurality of negative bags, and the plurality of sets of weights; and
   storing the unified classifier.

14. The non-transitory computer-readable storage medium of claim 13, wherein the videos of the positive training set include false positives and true positives with respect to the labeled category, and each of the positive bags comprises at least one true positive video and at least one false positive video.

15. The non-transitory computer-readable medium of claim 13, wherein each video is associated with a feature vector determined by a set of initial classifiers, and training the unified classifier based on the plurality of positive bags and plurality of negative bags comprises training the unified classifier based on the feature vectors associated with the videos in the plurality of positive bags and the plurality of negative bags.

16. The non-transitory computer-readable medium of claim 15, wherein the actions of the computer program instructions further comprise training the set of initial classifiers, the set of initial classifiers including a first initial classifier trained using a first initial positive training set comprising co-watched videos with a group of authoritatively labeled videos, and a second initial classifier trained using a second initial positive training set comprising search videos and the group of authoritatively labeled videos.

17. The non-transitory computer-readable medium of claim 15, wherein the actions of the computer program instructions further comprise training the set of initial classifiers, the set of initial classifiers including a first initial classifier trained using a first initial training set comprising videos, and a second initial classifier trained using a second initial training set comprising non-video media.

18. The non-transitory computer-readable medium of claim 17, wherein the non-video media is selected from the group consisting of textual documents, audio, images, and any combination thereof.

* * * * *